United States Patent [19]
Robertson

[11] Patent Number: 5,791,983
[45] Date of Patent: Aug. 11, 1998

[54] DEMAND VENTILATION SYSTEM

[75] Inventor: Gray Robertson, Fairfax, Va.

[73] Assignee: Healthy Buildings International, Fairfax, Va.

[21] Appl. No.: 546,338

[22] Filed: Oct. 20, 1995

[51] Int. Cl.[6] .................................................. F24F 11/04
[52] U.S. Cl. .......................... 454/229; 454/238; 454/239; 454/252
[58] Field of Search ........................ 454/229, 236, 454/238, 239, 252, 340

[56] References Cited

U.S. PATENT DOCUMENTS

| | | | |
|---|---|---|---|
| 3,294,480 | 12/1966 | Potapenko | 454/238 X |
| 4,955,285 | 9/1990 | Geilinger et al. | 454/251 X |
| 5,004,483 | 4/1991 | Eller et al. | 454/238 X |
| 5,290,200 | 3/1994 | Kiser | 454/229 |
| 5,314,376 | 5/1994 | Kuramarohit | 454/236 X |

FOREIGN PATENT DOCUMENTS 3-50432  3/1991  Japan ...................................... 454/239

Primary Examiner—Harold Joyce
Attorney, Agent, or Firm—Higgs, Fletcher & Mack; Bernard L. Kleinke

[57] ABSTRACT

A pair of variable air volume fans and a set of primary and exhaust air diffusers are in atmospheric communication between a supply of ventilation air that employs the principles of thermal displacement ventilation for purging a designated smoking area of smoke pollutants and the outside atmosphere for receiving the purged polluted air. The volume of ventilation air supplied to the designated area and the volume of air exhausted from the designated area is based upon air quality demand requirements and is determined by a microprocessor coupled to a gas sensor disposed within the designated smoking area.

20 Claims, 2 Drawing Sheets

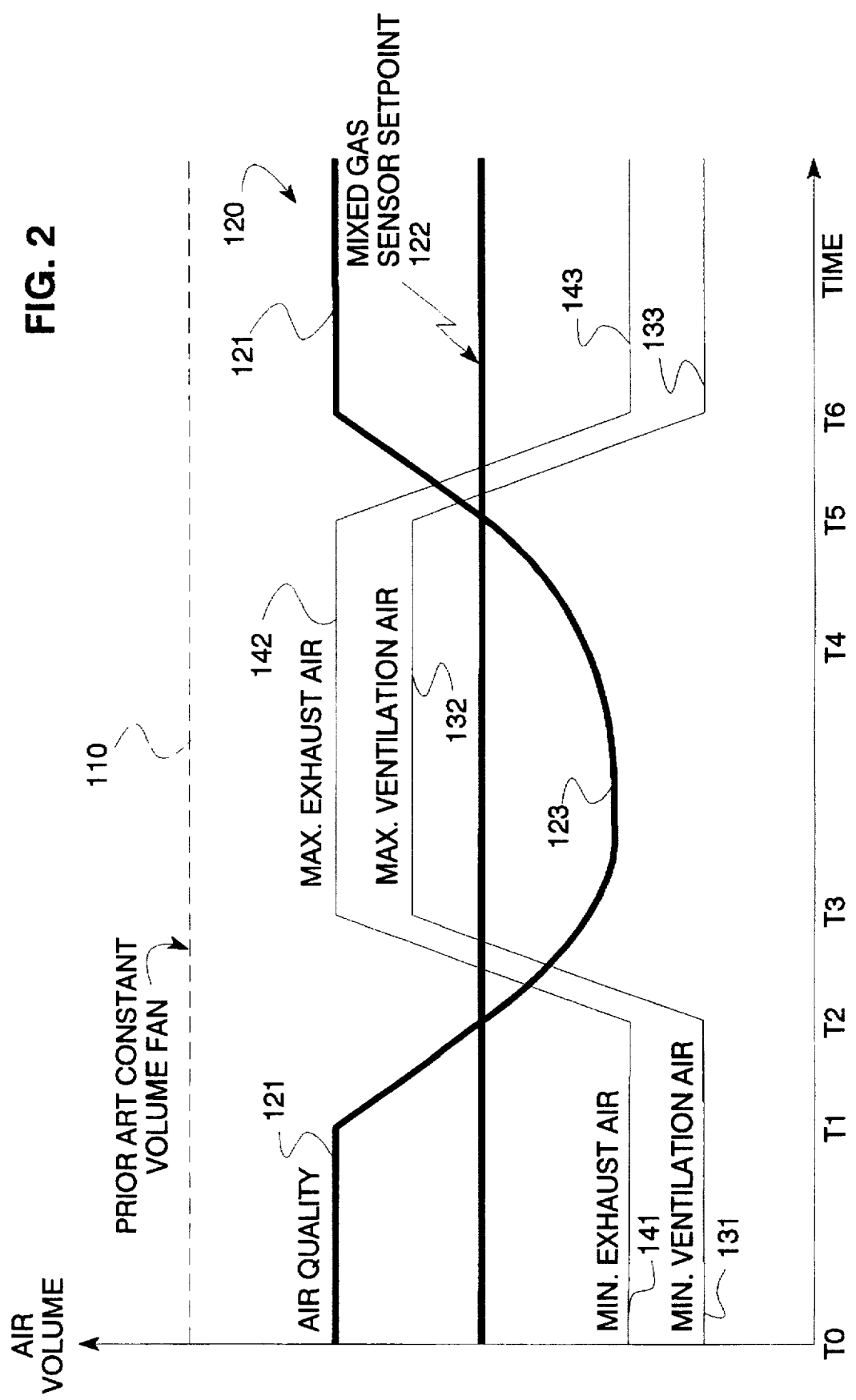

DEMAND VENTILATION SYSTEM

TECHNICAL FIELD

The present invention relates in general to a demand ventilation system and it more particularly relates to an improved ventilation system based on thermal displacement ventilation coupled with automatic fan controls to provide air flow to a space in a desired manner based on air quality demand requirements.

BACKGROUND ART

There have been many types and kinds of ventilation systems to control air within a space. For example, reference may be made to the following U.S. Pat. Nos. 3,653,589; 4,044,949; 4,182,484; 4,328,926; 4,394,957; 4,420,840; 4,428,017; 4,560,103; 4,607,789; 4,657,178; 4,754,919; 4,442,921; and 5,005,636.

While such systems have been generally satisfactory for controlling air temperature within a space, recent legislation written at local, state and national levels relating to air quality requirements have made such systems less than satisfactory. In this regard, such legislation has dictated that smoking in public buildings shall be prohibited unless special segregated smoking areas are provided. Such segregated areas must therefore be isolated from the return and primary air supplies of such systems so that secondary or exhaust air from the segregated area is not commingled with the other return air circulating from other parts of a given building.

One attempted solution at solving this problem has been to provide a separate smoking lounge space with an exhaust system having a continually operated exhaust fan for purging the pollutants within the room to the outside atmosphere. While such a system may cleanse a room of residual smoke, such a system is relatively expensive. In this regard, the operation of such a system is based upon maximum room load occupancy.

DISCLOSURE OF INVENTION

Therefore, the principal object of the present invention is to provide a new and improved ventilation system which automatically controls the output volume of air being exhausted from a designated area so that polluted air within the room is purged to the outside atmosphere in a cost efficient manner. Such a system is conveniently and easily installed in an existing variable air volume ventilation system and is relatively inexpensive to operate.

Briefly, the above and further objects of the present invention are realized by providing a new and improved ventilation system which can automatically exhaust airborne pollutants from a designated area or space based upon air quality demand requirements according to a novel purging method of the present invention.

The ventilation system generally includes a pair of variable air volume fans and a set of primary and exhaust air diffusers which are in atmospheric communication between a supply of ventilation air for purging the designated smoking area of airborne pollutants and the outside atmosphere for receiving the purged polluted air. The volume of ventilation air supplied to the designated area and the volume of air exhausted from the designated area is continually varied based upon air quality demand requirements and is determined by a microprocessor coupled to a gas sensor disposed within the designated smoking area.

BRIEF DESCRIPTION OF DRAWINGS

The above mentioned and other objects and features of this invention and the manner of attaining them will become apparent, and the invention itself will be best understood by reference to the following description of the embodiment of the invention in conjunction with the accompanying drawings, wherein:

FIG. 2 is a graph which is helpful in understanding the operation of the system of FIG. 1.

BEST MODE FOR CARRYING OUT THE INVENTION

Figure 1:
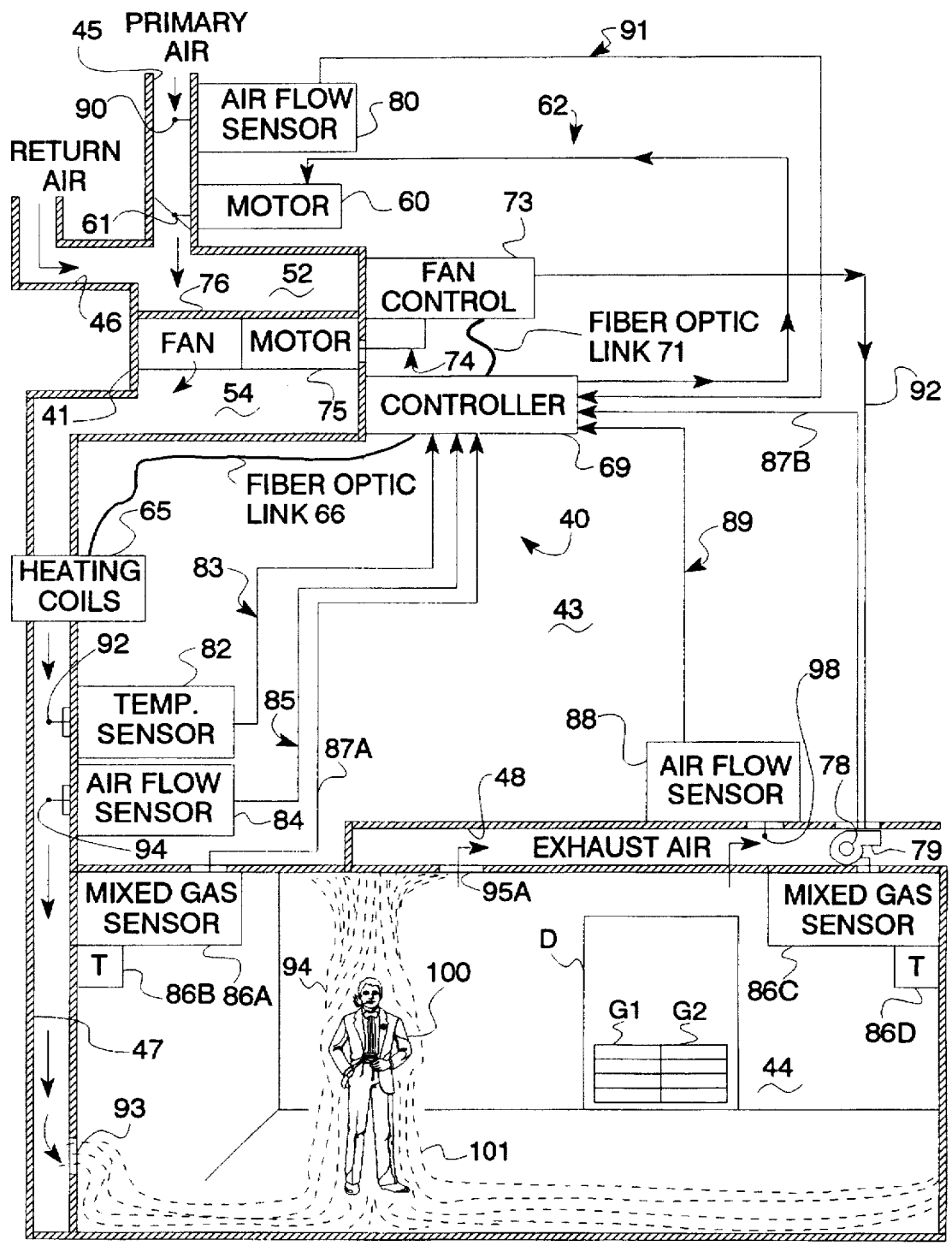
FIG. 1 is a schematic view of a demand ventilation system which is constructed in accordance with the present invention.

Referring now to the drawings and more particularly to FIG. 1 thereof, there is shown a demand variable air ventilation system 10, which is constructed in accordance with the present invention. As will be explained hereinafter in greater detail, the system 10 provides a combination of return air with primary supply air along the floor of a designated smoking room area at a predefined low velocity and temperature in a given building to displace upwardly the air within the room. Such action facilitates the discharge of smoke and other airborne pollutants from the room in such a manner that the pollutants are substantially prevented from escaping to other occupant occupied areas within the building. The system 10 includes a variable air volume terminal unit 40 having a housing 41, which is mounted in a plenum space 43 above a designated smoking area or space 44.

The housing 41 includes an air mixing chamber 52 that receives a supply of primary cooling air via a primary air duct 45 and a supply of building return air directly from the return air plenum 43. A fan 76 draws air from the chamber 52 and discharges it into the interior of an adjacent chamber 54 of the housing 41, and from there through a heating coil 65 and into a ventilation air duct 47 to supply cool low velocity ventilation air to the designated smoking area 44.

A controller 69 is mounted to the outside of the housing 41 and is disposed in relatively close proximity to the smoking area 44. The controller 69 monitors continuously a set of variable conditions including the volume of primary air available to the terminal unit 40, the temperature and volume of the ventilation air entering the space 44, the condition of the air in the space 44 and the volume of air being exhausted from the space 44 into the outside atmosphere. The controller 69 generates a continuously varying control signal indicative of a desired quantity of low velocity, low temperature ventilation air required to displace or ventilate airborne pollutants within the space 44 to the outside atmosphere and a desired quantity of exhaust air to substantially prevent the displaced polluted air from escaping from the designated area 44 to contaminate the building return air. A fiber optic link or light conduit 71 is interconnected between a controller 69 and a fan control unit 73 for supplying the control signal thereto.

The fan control unit 73 is also mounted on the outside of the housing 41 and is coupled electrically to an exhaust fan motor 78 for controlling the speed of an exhaust fan 79 and to a ventilation air fan motor 75 for controlling the speed of the fan 76. The fan control 73 responds to the control signal received from the controller 69, via the fiber optic link 71, to cause the motor 75 and fan 76 to vary continuously the flow rate of the ventilation air entering the space 44 and to cause the motor 78 and fan 79 to maintain the air pressure within the space 44 at a negative pressure level relative to adjacent areas by ensuring that more exhaust air leaves the space than supply air enters the space. Thus, spillage of smoke and other airborne pollutants to such surrounding areas is substantially prevented.

Furthermore, in operation the driving force of the upward movement of the air entering the room is facilitated by the air absorbing the heat within the room. Specifically, with supply air spilling across the floor into the space 44 at about 68° F., the thermal effect created by the persons occupying the room will cause the air to rise and achieve a flow rate of about 50 to 60 cubic feet per minute per person. Thus, the air entering at floor level will slowly increase in flow rate as its move upwardly along the body of each person within the space 44, passing over and above their heads.

To facilitate the transfer of air from adjacent areas and to cause air induction into the space 44, each door, such as the door D into the space includes a set of grilles or openings, such as the grilles G1 and G2. Alternatively, the doors can be omitted such that the aperture itself acts as a large transfer grille into the space.

In short then, the combined effect of the air rising due to the body heat of the persons in the space 44, the grilles G1, G2 and the ceiling mounted exhaust fan 79 causes the air to be ventilated from the space 44 in a very efficient and cost effective manner.

As hereinafter described in greater detail, the controller 69 causes an exhaust fan control signal to vary in a proportional manner relative to the speed or flow rate of the ventilation air for displacing the polluted air within the space 44. The fan control 73 responds to the control signals received via the fiber optic link 71 to drive the motor 75 in substantially a continuous manner and the motor 78 in an as needed manner as described in more detail relative to FIG. 2.

The controller 69 generates the control signals sent via the fiber optic link 71 to the fan control 73 in response to a set of variables. In this regard, a pair of mixed gas or air quality control sensors 86A and 86C disposed within the space 44 each having a temperature sensor 86B and 86D, respectively, provides pairs of signals to the controller 69 via a conductor pair 87A and 87B. Each signal pair being indicative of the quality of the air within the space 44 and the temperature of the air within the space 44. In this regard the mixed gas sensors 86A, 86C detect whether the air within the space 44 includes any airborne pollutants, such as the pollutants caused by one or more persons smoking in the designated area 44. The detection or setpoints of the sensors 86A and 86C are adjustable for different desired levels of pollutants. Suitable mixed gas sensors are manufactured by Staefa Control System Inc. of San Diego, Calif.

A temperature sensor 82 having a temperature sensing element 92 disposed within the ventilation air duct 47 provides a ventilation air temperature signal 83 to the controller 69, which signal 83 is indicative of the temperature of low velocity ventilation air entering or spilling into the space 44. In this regard, in order to help the ventilation air discharged into the space 44 to form an air displacement plume about a person within the space 44, such as a person 100, the temperature of the air entering the space should be slightly cooler than a desired room temperature of between about 74 degrees Fahrenheit and about 70 degrees Fahrenheit. In this regard, the ventilation air should be between about 72 degrees Fahrenheit and about 64 degrees Fahrenheit. A more preferred range is between about 70 degrees and 65 degrees. The most preferred range is between about 68 degrees and 66 degrees.

An air flow sensor 84 having an element 94 disposed within the ventilation air duct 47 provides a ventilation air flow rate signal 85 to the controller 69, which signal 85 is indicative of the flow rate of the ventilation air being discharged into the space 44 via a low level air diffuser indicated generally at 93. In this regard, in order to help the ventilation air discharged into the space 44 to form an air displacement plume about a person within the space 44, such as the person 100, the air flow rate of air entering the space 44 should be about eight feet per minute under no or light pollutant conditions and about thirty-five feet per minute under maximum pollutant condition.

An air flow sensor 88 having an element 98 disposed within an exhaust air duct 48 provides an exhaust air flow rate signal 89 to the controller 69, which signal 89 is indicative of the flow rate of the exhaust air being received from the space 44 via an exhaust air diffuser 95A, for discharge into the outside atmosphere. Variations may include use of two or more supply diffusers and two or more exhaust grilles. In this regard, in order to assure that the polluted air within the space 44 does not escape to be commingled with the building return air, the flow rate of the exhaust air should have an initial rate between about zero feet per minute and about four feet per minute to assure the air pressure within the room is maintained at a negative pressure relative to the outside atmospheric pressure and should be varied continuously proportionally relative to the flow rate of the incoming ventilation air as it is increased and decreased relative to the pollutant condition of the air in the space 44.

An air flow sensor 80 having an element 90 in the primary air duct 45 conveying the cooled primary air under pressure to the terminal unit 40 provides a primary air flow rate signal 91 to the controller 69, which signal 91 is indicative of the flow rate of cooled primary air available for drawing into the terminal 40. The temperature of the primary air may typically be 55 degrees Fahrenheit, and it mixes in the mixing chamber 52 with the return air from the building at, for example, a higher temperature and then drawn into the heating coils 65 to raise the temperature so that the ventilation air is maintained at about five degrees Fahrenheit lower than the desired air temperature in the space 44.

It should be understood by those skilled in the art that the mixing of one part primary air at about 55 degrees Fahrenheit with two parts return air at about 75 degrees Fahrenheit results in incidental ventilation air supply temperatures of about 68 degrees Fahrenheit. Such an ideal temperature of 68 degrees Fahrenheit is precisely within the most preferred range of about 66 degrees Fahrenheit to about 68 degrees Fahrenheit.

An electric damper motor 60 is controlled by a response to a damper primary air control signal 61 received from the controller 69. As hereinafter described in greater detail, the damper control signal 61 for driving the motor 60 and a damper 61 depends on the flow rate and temperature of the ventilation air being delivered to the space 44 via the ventilation air duct 47.

A fiber optic link or light conduit 66 conveys a continuous heat signal from the controller 69 to the heating element 65. Thus, the element 65 is driven by the signal to modulate the amount of heating of the ventilation air being discharged into the ventilation air duct 47.

The fan control 73 under the control of the controller 69 varies the output volume of the exhaust fan 79 to discharge pollutant within the space 44 into the outside atmosphere. The exhaust fan 79 is modulated only on a demand need basis and thus provides an economic benefit. When the pollutant level within the room increases, the flow of ventilation air is increased proportionally from a minimum flow rate level of about eight feet per minute to up to about thirty feet per minute. As the flow rate of the ventilation is modulated toward the maximum flow rate, the speed of the exhaust fan 79 is modulated proportional to provide additional ventilation to the space 44 so that substantially none of the polluted air escapes from the space 44 into the return air system of the building.

System Operation

Referring now to FIG. 2, the operation of the system will now be described in greater detail. The terminal unit 40 modulates the cooled primary air available for mixing with the returned air from the building and continuously varies the speed of the fan 76, the damper 61, and the heating elements 65 so that flow rate of the ventilation air entering the space 44 meets the ventilation demand requirements based upon the amount of pollutants sensed in the space 44. The terminal unit 40 also modulates the speed of the exhaust fan 79 to assure a positive air flow is maintained from the space 44 to the outside atmosphere.

As best seen in FIG. 2, prior art air handling systems cause an exhaust fan to operate at a maximum speed to maintain a constant air flow from a designated space to the outside atmosphere. The dotted line 110 (FIG. 2) indicates the constant air volume of the exhaust air as taught by the prior art.

Referring now to FIG. 2, the present inventive method will be described in greater detail. A bar line indicated generally at 120 is indicative of the quality of the air within the space 44. In this regard, at the initialization of the system 10, the air quality is shown at acceptable set point level 121 between $T_0$ and $T_1$. In this regard, the flow rate of the ventilation air entering the space 44 is illustrated at an initialization level 131 of about eight feet per minute. As the ventilated air entering the space 44 is at about eight feet per minute, the exhaust fan will be modulated to maintain a constant exhaust air flow rate level 141.

At $T_1$ time a person, such as the person 100 enters the space 44 and begins smoking a cigarette. Incoming low temperature low velocity ventilation air spilling into the space 44 travels along the floor of the space and then slowly starts to warm as it circulates about the body of the person 100. As the air warms around the body of the person 100, it forms a plume indicated generally at 101. The plume 101, in turn, causes the cigarette airborne pollutants to be disbursed upwardly through a breathing zone indicated generally at 94 and thence upwardly toward the sensors 86A, 86C and diffuser 95A, 95C. The controller 69 monitors continuously the flow of ventilation air entering the space 44 via the flow sensor 84 and the quality of the air in the space via the sensors 86A, 86C. In this regard, when the setpoint 122 of either of the mixed gas sensors 86A, 86B is reached, the flow rate of the ventilation air is increased slowly from its minimum level 131 toward a maximum level indicated generally at 132.

As the flow rate of the ventilation air is increased between $T_2$ and $T_3$, the flow rate of the exhaust air is increased proportionally to the flow rate increase of the ventilation air so that the exhaust fan is operating at a speed sufficient to cause a maximum flow of exhaust air indicated generally at 142.

As the ventilation air fan 76 and exhaust air fan 79 increase speed to their maximum rates, the quality of the air in the space 44 reaches a substantially steady level indicated generally at 123.

At $T_4$ time the quality of the air in the space 44 begins to improve until the air quality again reaches the setpoint 122. In this regard, when the setpoint 122 is reached at $T_5$, both the ventilation air fan 76 and the exhaust air fan 79 are modulated to continually decrease the flow of ventilation and exhaust air respectively. At $T_6$ time, the air quality reaches an acceptable level indicated generally at 121. In response to the acceptable level 121 being achieved, the ventilation fan 76 is brought to a constant ventilation air level indicated generally at 133, while the exhaust fan is modulated at a negative pressure level indicated generally 143 so that the positive flow rate of exhaust air to the atmosphere is maintained in the exhaust duct 48.

While the above example, illustrated the exhaust fan 79 to be operated continuously between maximum and minimum levels, it should be understood that the exhaust fan 79 may be turned off so long as the quality of the air in the space is at an acceptable level and there is a positive flow of air from the space 44 to the outside atmosphere via the exhaust duct 48. Such a positive flow of air assures that substantially all of the air in the space 44 will flow continuously upwardly from the ventilation air diffusers 93 and 94 into the exhaust air diffusers 95A and 95B and outwardly to be exhausted into the outside atmosphere.

It should also be understood that as the ventilation and exhaust fans are modulated between their minimum and maximum speeds, the air quality may improve sufficiently so that maximum speeds are never achieved. Thus, by such modulation, significant cost savings can be achieved.

While particular embodiments of the present invention have been disclosed, it is to be understood that various different modifications are possible and are contemplated within the true spirit and scope of the appended claims. There is no intention, therefore, of limitations to the exact abstract or disclosure herein presented.

What is claimed is:

1. A method of controlling the discharge of pollutant in a designated space within a structure having a floor upon demand, comprising:

introducing low temperature air at the floor of the space;

exhausting the air from a high level within the space to the outside atmosphere at an optimum rate;

detecting the presence of pollutants in the air within the designated space to help facilitate air displacement within the space based upon air quality demand requirements;

increasing the flowing of the low temperature air when the air quality decreases below a predetermined reference level toward a maximum speed and modulating the exhaust air proportionally so that the atmospheric pressure within the space is maintained at a negative pressure relative to adjacent areas to facilitate exhausting the polluted air with substantially no polluted air being returned to the structure outside of the designated space, and so that a sufficient volume of cool ventilation air is discharged into the space at about floor level to cause the air in the space to be displaced upwardly so that the polluted air rises and is exhausted from a high level of the space into the outside atmosphere.

2. A demand ventilation system, comprising:

variable exhaust ventilation means, includes exhaust for means, in atmospheric communication between a designated space within a structure of a building and the outside atmosphere for exhausting polluted air within the space to the outside atmosphere;

variable low velocity ventilation means in atmospheric communication between said designated space and a supply of primary and building return air for supplying the designated space with a given volume of ventilation air at a predetermined temperature to enable the polluted air within the space to rise and be exhausted at a high level into the outside atmosphere;

pollutant sensing means disposed within the designated space for detecting the presence of pollutants in the air within the designated space to help facilitate air displacement within the space based upon air quality demand requirements;

control means coupled to said exhaust fan means and said low velocity ventilation means for varying continuously their respective speeds in synchronism relative to one another so that the atmospheric pressure within the space is maintained at a negative pressure relative to the adjacent areas to facilitate exhausting the polluted air with substantially no polluted air being returned to the structure outside of the designated space, and so that a sufficient volume of ventilation air several degrees cooler than the desired room air is discharged into the space at about floor level to cause polluted air in the space to be displaced upwardly so that the polluted air is collected at a high level and is exhausted into the outside atmosphere.

3. A system according to claim 2, wherein said exhaust ventilation means includes:

exhaust diffuser means adjacent to the ceiling in the designated space for receiving the exhaust air being displaced within the designated space by the clean air entering the space; and exhaust volume sensing means coupled electrically to said control means for helping to control the volume of exhaust air being discharged into the atmosphere outside of the building at such a rate so as to maintain a negative pressure in the space relative to adjacent areas.

4. A system according to claim 3, wherein said exhaust fan means includes:

a fan for helping to control the pressure of the exhaust air; and a fan motor coupled electrically to said control means for helping to control the rotational speed of said fan to maintain a desired exhaust air pressure.

5. A system according to claim 3, wherein said exhaust diffuser means includes:

exhaust duct means for defining an enclosed atmospheric path from the designated space to the atmosphere outside of said building to permit the exhaust air to be discharged from the designated space into the atmosphere without commingling with the indoor air in the other occupant spaces within the building; and at least one exhaust diffuser disposed in the ceiling of the designated space for receiving the displaced exhaust air to enable it to be discharged to the atmosphere outside of the building.

6. A system according to claim 5, wherein said volume sensing means includes a volume sensor coupled electrically to said control means and being partially disposed in said duct exhaust means for helping to determine the volume of exhaust atmosphere passing through said exhaust duct means over a predefined period of time.

7. A system according to claim 3, wherein said variable ventilation means includes:

ventilation air diffusion means for helping to distribute the ventilation air across the floor within the space.

8. A system according to claim 7, wherein said ventilation air diffusion means includes at least one ventilation air diffuser disposed adjacent to the floor of the designated space to direct said ventilation air onto the floor.

9. A system according to claim 7, wherein said low velocity ventilation means includes:

variable air volume enclosure means in atmospheric communication with the building return air and the primary ventilation air to enable them to be mixed for supplying the designated space with said given volume of ventilation air;

primary air ventilation means in atmospheric communication with a supply of primary ventilation air under pressure for supplying it to said variable air volume enclosure means; and designated space duct means for defining an enclosed atmospheric path from said variable air volume enclosure means to said ventilation air diffusion means to permit the clean ventilation air to be discharged into the designated space.

10. A system according to claim 9, wherein said variable ventilation means includes:

ventilation air fan means coupled electrically to said controller for helping to control the volume of air mixture supplied to the designated space; and enclosure means for defining a mixing space for receiving the primary ventilation air under pressure and the building return air;

said enclosure means being in atmospheric communication with said designated space duct means to enable the air mixed in said enclosure means to be supplied to the designated space.

11. A system according to claim 10, wherein said air fan means includes:

a ventilation fan for helping to control the volume of ventilation air mixture supplied to the designated space; and an air fan motor coupled to the ventilation air fan for controlling its rotational speed to supply a desired volume of air mixture to the designated space.

12. A system according to claim 9, wherein said primary air ventilation means includes:

a primary air duct means for defining an enclosed primary air atmospheric path from said supply of primary air under pressure to said variable air volume enclosure means;

primary air damper means partially disposed on said enclosed primary air atmospheric path for helping to control the volume of primary air under pressure supplied to said variable air volume enclosure means; and primary air volume sensor means partially disposed in said primary air duct means for detecting the volume of primary air passing through said primary air duct means over a predefined period of time.

13. A system according to claim 12, wherein said primary air damper means includes:

a primary damper for helping to control the volume of primary air supplied to said variable air volume enclosure means; and primary damper motor means coupled electrically to said control means for opening and closing said damper to permit the volume of primary air to be controlled for ventilation purposes.

14. A system according to claim 2, wherein said control means includes:

temperature sensor means disposed within the designated space for helping to determine the temperature of the air within the designated space so that the ventilation air supplied to said air diffusion means can be maintained at a temperature substantially lower than the temperature of air within the space to enable the disbursed air mixture to slowly rise from the floor as its temperature slowly increases to the sensed temperature of the air within the designated space; and wherein pollutant sensing means is a mixed gas sensing means.

15. A system according to claim 14, wherein said mixed gas sensing means is a smoke detector.

16. A system according to claim 14, wherein said temperature sensor means includes:

means for selecting a desired room temperature;

means for generating a signal indicative of a selected desired temperature; and means for generating a signal indicative of the room temperature.

17. A system according to claim 2, wherein said control means includes:

controller means coupled to said exhaust fan means and to said low velocity ventilation means for controlling the volume of primary air delivered to the designated space, and for helping to maintain the volume of exhaust atmosphere discharged into the atmosphere outside of the building at a desired volume.

18. A system according to claim 2, further comprising:

reheat valve means coupled to said low velocity ventilation means and to said controller means for preventing the temperature in the designated space from being substantially less than said desired temperature when a large volume of primary ventilation air is required to be supplied to the designated space to maintain a desired air quality.

19. A system for controlling the ventilation within at least one occupant designated space among a plurality of occupant spaces in a building, said at least one designated space being defined by a floor, a ceiling, and a plurality of walls for helping to isolate the exhaust air within the designated space from the supply or return air in the other occupant spaces within the building, comprising:

exhaust ventilation means partially disposed in the ceiling of the designated space and in atmospheric communication with the atmosphere outside of the building for permitting the exhaust air within the designated space to be exhausted out of the building so that any pollutants in the exhaust air will be substantially prevented from commingling with the indoor air in the other occupant spaces within the building;

volume sensing means in atmospheric communication with the exhaust air within said exhaust ventilation means for determining the volume of exhaust air being discharged into the atmosphere outside of the building to help facilitate maintaining the atmospheric pressure within the designated space at a pressure level substantially lower than the pressure level of adjacent areas of the building to substantially prevent the exhaust air from infiltrating the air in the other occupant spaces within the building;

air diffusion means partially disposed at about the floor in the designated space for helping to disburse a clean air mixture supply of low velocity ventilation air at about floor level of the designated space to permit the disbursed air mixture to slowly rise from the floor as it warms to form low velocity plumes around each of the occupants within the designated space to draw clean air past the breathing zone of each occupant therein and thence upwardly carrying any pollutants discharged by the occupants forming the exhaust air so that it may be drawn into said exhaust ventilation means and discharged into the atmosphere outside of the building;

low velocity ventilating means in atmospheric communication with said air diffusion means for supplying said air mixture supply;

temperature sensor means disposed within the designated space for helping to determine the temperature of the air within the designated space so that the clean air supplied to said air diffusion means can be maintained at a temperature substantially lower than the temperature of air within the space to enable the disbursed air mixture to slowly rise from the floor as its temperature slowly increases to the sensed temperature of the air within the designated space;

pollutant sensing means for detecting the presence of pollutants in the air within the designated space to help facilitate air displacement based on actual space demand;

controller means coupled to said exhaust ventilation means and to said volume sensing means for controlling the air pressure of the exhaust air within the designated space so that it is maintained at a substantially lower pressure than the air in the adjacent areas of the building;

said controller means further coupled to said low velocity ventilation means, said temperature sensor means and to said pollutant sensing means for supplying a sufficient supply of said clean air mixture to maintain the temperature of the air within the space at a desired temperature in the absence of any detected pollutants in the air within the designated space and for supplying another sufficient supply of said clean air mixture to maintain the temperature of the clean air supplied to said air diffusion means at a temperature substantially below said desired temperature so that the temperature of the air mixture discharged along the floor of the designated space can slowly warm to said desired temperature for helping to form the low velocity plumes around each of the occupants within the designated space only on an actual space demand related to the detection of pollutants within the designated space; and whereby as occupants within the designated space emit pollutants, the temperature of the air discharged along the floor will be maintained at a temperature substantially below said desired temperature to cause the polluted air within the space to be continuously displaced upwards by the clean air entering the space so that the polluted air is carried above the breathing zone of the occupants and is collected at a high level into said exhaust ventilation means and thence to the atmosphere outside the building without infiltrating or being commingled with the atmosphere in the occupant spaces within the building.

20. A method permitting the exhaust air within the designated space to be exhausted out of the building so that any pollutants in the exhaust air will be substantially prevented from commingling with the indoor air in the other occupant spaces within the building;

determining the volume of exhaust air being discharged into the atmosphere outside of the building to help facilitate maintaining the atmospheric pressure within the designated space at a pressure level substantially lower than the pressure level of adjacent areas of the building to substantially prevent the exhaust air from infiltrating the indoor air in the other occupant spaces within the building;

distributing a clean air mixture supply of primary ventilation air and building return air along the floor of the designated space to permit the distributed air mixture to slowly rise from the floor as it warms to draw clean air past an occupant therein and thence upwardly carrying any pollutants discharged by the occupant away from the breathing zone to form the exhaust air so that it may be discharged into the atmosphere outside of the building;

helping to determine the temperature of the air within the designated space so that the distributed clean air can be maintained at a temperature substantially lower than the temperature of air within the designated space to enable the disbursed air mixture to slowly rise from the floor as its temperature slowly increases to the sensed temperature of the air within the designated space;

detecting the presence of pollutants in the air within the designated space to help facilitate air displacement based on actual space demand;

supplying a sufficient supply of said clean air mixture to maintain the temperature of the air within the space at a desired temperature in the absence of any detected pollutants in the air within the designated space and for supplying another sufficient supply of said clean air mixture to maintain the temperature of the clean air at a temperature substantially below said desired temperature so that the temperature of the air mixture discharged along the floor of the designated space can slowly warm to said desired temperature for helping to form low velocity plumes around each of the occupants within the designated space only on an actual space demand related to the detection of pollutants within the designated space; and whereby as occupants within the designated space emit pollutants, the temperature of the air discharged along the floor will be maintained at a temperature substantially below said desired temperature to cause the polluted air within the space to be continuously displaced upwards by the clean air entering the space so that the polluted air is carried above the breathing zone of the occupants and is collected at a high level via the exhaust and is then discharged into the atmosphere outside the building without infiltrating or being commingled with the indoor air in the adjacent occupant spaces within the building.

* * * * *